United States Patent
Fujimori

(10) Patent No.: US 12,438,674 B2
(45) Date of Patent: Oct. 7, 2025

(54) COMMUNICATION APPARATUS, CONTROL METHOD OF COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Yuki Fujimori, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 18/301,086

(22) Filed: Apr. 14, 2023

(65) Prior Publication Data
US 2023/0254089 A1    Aug. 10, 2023

Related U.S. Application Data

(63) Continuation of application No. PCT/JP2021/035311, filed on Sep. 27, 2021.

(30) Foreign Application Priority Data

Oct. 22, 2020    (JP) .................................. 2020-177444

(51) Int. Cl.
    H04L 5/00        (2006.01)
    H04L 1/1607      (2023.01)
(52) U.S. Cl.
    CPC .......... *H04L 5/0053* (2013.01); *H04L 1/1642* (2013.01)
(58) Field of Classification Search
    None
    See application file for complete search history.

(56) References Cited

U.S. PATENT DOCUMENTS

2018/0338266 A1*  11/2018  Sakai .................... H04W 84/12

FOREIGN PATENT DOCUMENTS

JP    2015529047 A    10/2015
JP    2018050133 A     3/2018
(Continued)

OTHER PUBLICATIONS

Iwen Chu; Young Hoon Kwon; Manish Kumar; Hongyuan Zhang; Yan Zhang; Rui Cao; Sudhir Srinivasa; Hui-Ling Lou. (NXP); "BA Consideration"; IEEE 802.11-20/0061r3; May 26, 2020; pp. 1-9.
(Continued)

*Primary Examiner* — Robert M Morlan
(74) *Attorney, Agent, or Firm* — Canon U.S.A., Inc. IP Division

(57) ABSTRACT

There is provided a communication apparatus compliant with the IEEE802.11 standard series, comprising: reception unit configured to receive, from a communication partner apparatus, a plurality of data frames respectively assigned with sequence numbers; generation unit configured to generate an acknowledgement (Ack) frame for the plurality of data frames received by the reception unit; and transmission unit configured to transmit, to the communication partner apparatus, the Ack frame generated by the generation unit, wherein the generation unit sets, in the Ack frame, specification information that specifies at least one data frame set distinguished for every series of data frames having consecutive sequence numbers out of the plurality of received data frames.

11 Claims, 9 Drawing Sheets

(56) References Cited

FOREIGN PATENT DOCUMENTS

| | | |
|---|---|---|
| WO | 2014014577 A1 | 1/2014 |
| WO | 2017094331 A1 | 6/2017 |

OTHER PUBLICATIONS

Liwen Chu; Young Hoon Kwon; Manish Kumar; Hongyuan Zhang; Yan Zhang; Rui Cao; Sudhir Srinivasa; Hui-Ling Lou. (NXP); "Sequence number and BA operation with large BA buffer size"; IEEE 802.11-20/0397r4; Mar. 1, 2020; pp. 1-10.

* cited by examiner

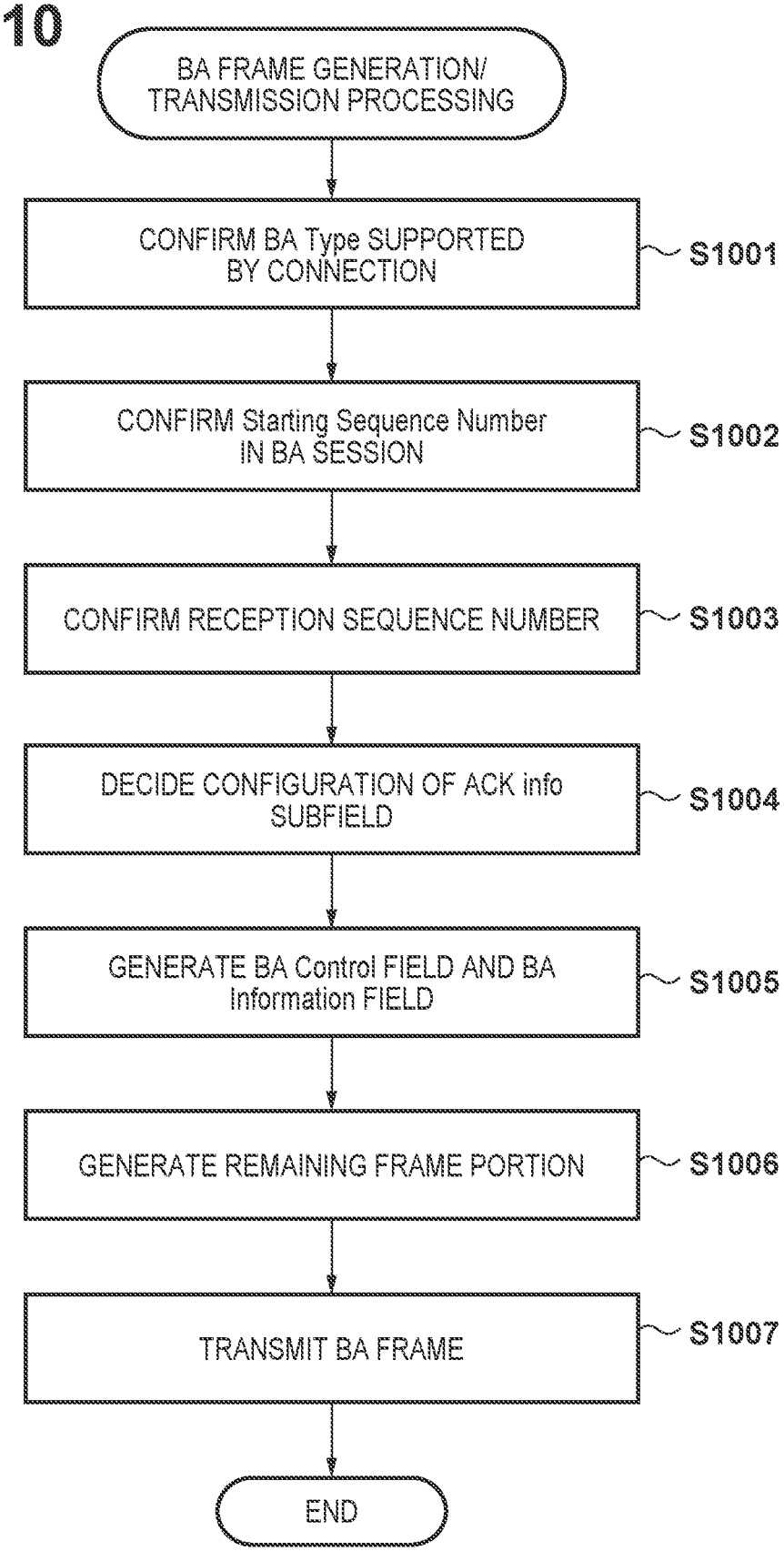

COMMUNICATION APPARATUS, CONTROL METHOD OF COMMUNICATION APPARATUS, AND NON-TRANSITORY COMPUTER-READABLE STORAGE MEDIUM

CROSS-REFERENCE TO RELATED APPLICATIONS

This application is a Continuation of International Patent Application No. PCT/JP2021/035311, filed Sep. 27, 2021, which claims the benefit of Japanese Patent Application No. 2020-177444, filed Oct. 22, 2020, both of which are hereby incorporated by reference herein in their entireties.

BACKGROUND OF THE INVENTION

Field of the Invention

The present invention relates to a wireless communication technique.

Background Art

The IEEE802.11 series is known as a wireless LAN (Local Area Network) communication standard defined by IEEE (Institute of Electrical and Electronics Engineers). The IEEE802.11 series standards include the IEEE802.11a/b/g/n/ac/ax standards (PTL 1).

As for reception of a plurality of wireless packets, the IEEE802.11ax standard discloses an extended specification of a BlockAck frame capable of transmitting an acknowledgement (ACK) by one frame. The IEEE802.11ax standard discloses a specification in which the number of Media Access Control (MAC) Protocol Data Unit (MPDU) expressible by BlockAck Bitmap in a BlockAck frame is extended to 256 from 64 expressible by up to IEEE802.11ac. An increased number of MPDUs for which an acknowledgement can be performed at once implements high throughput.

CITATION LIST

Patent Literature

PTL 1: Japanese Patent Laid-Open No. 2018-50133

To further improve the throughput or frequency use efficiency, IEEE has examined the definition of the IEEE802.11be standard as a new standard of the IEEE802.11 series. The IEEE802.11be standard proposes a method of further extending, to 512 or 1,024, the number of MPDUs for which an acknowledgement can be performed at once. This method can improve the throughput and frequency use efficiency. However, the extension undesirably increases the data amount of the acknowledgement, and the band is consumed much more than by the conventional method.

SUMMARY OF THE INVENTION

The present invention has been made to solve the above-described problems, and has as its object to provide a technique for implementing an acknowledgement with a small data amount.

To achieve the above object, a wireless communication apparatus according to an aspect of the present invention has the following arrangement. That is, there is provided a communication apparatus compliant with the IEEE802.11 standard series, comprising: reception unit configured to receive, from a communication partner apparatus, a plurality of data frames respectively assigned with sequence numbers; generation unit configured to generate an acknowledgement (Ack) frame for the plurality of data frames received by the reception unit; and transmission unit configured to transmit, to the communication partner apparatus, the Ack frame generated by the generation unit, wherein the generation unit sets, in the Ack frame, specification information that specifies at least one data frame set distinguished for every series of data frames having consecutive sequence numbers out of the plurality of received data frames.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 10 is a flowchart of BA frame generation/transmission processing.

DESCRIPTION OF THE EMBODIMENTS

Figure 1:
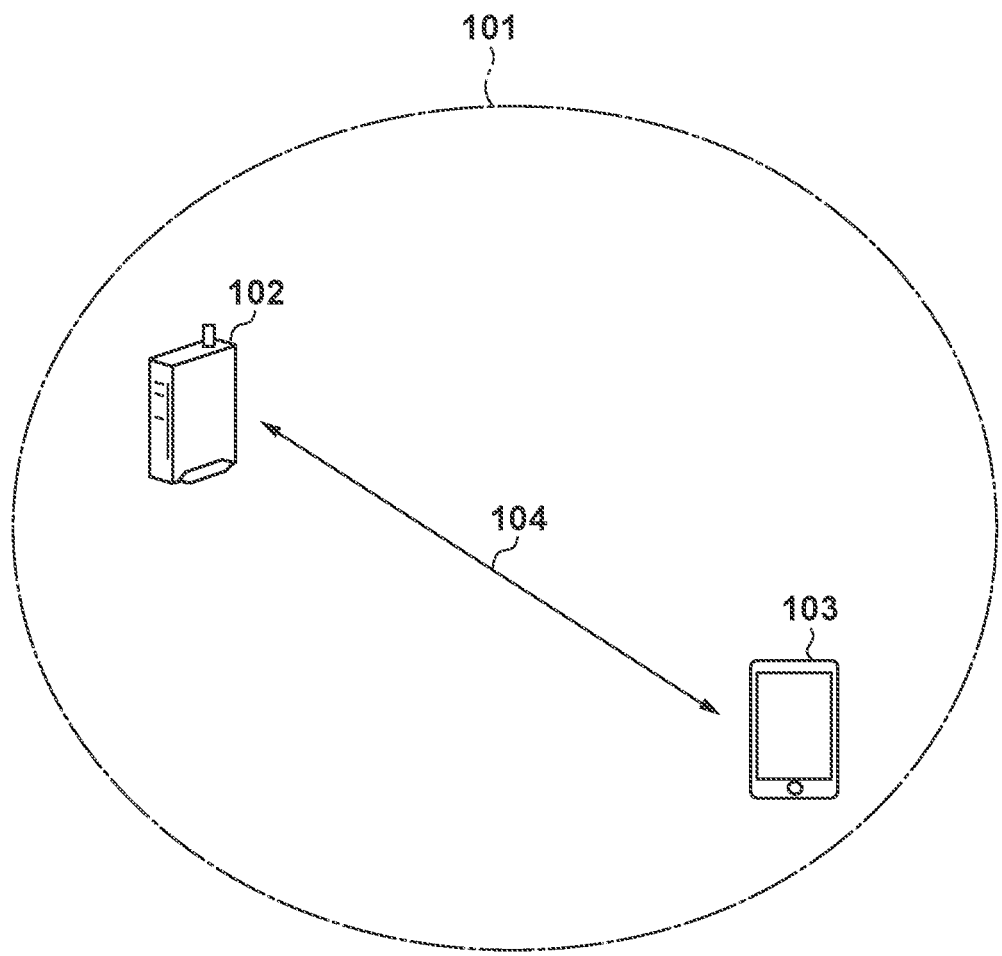
FIG. 1 is a view showing an example of a network configuration.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Network Configuration

FIG. 1 shows an example of the configuration of a network according to the embodiment. FIG. 1 shows a configuration including one Access Point (AP) (AP 102) and one station/terminal apparatus (STA) (STA 103) as communication apparatuses. Note that the description of the embodiment is applicable to both the AP and the STA and is not limited to either of them. As shown in FIG. 1, a circle 101 represents a network formed by the AP 102.

In the embodiment, the STA 103 can transmit/receive a frame to/from the AP 102 via a wireless link 104. The wireless link 104 can use channels of the 2.4 GHz, 5 GHz, and 6 GHz frequency bands, but a frequency band used is not limited to them and another frequency band such as the 60 GHz band may be used. The wireless link 104 is not limited to one link. Channels of the 2.4 GHz and 5 GHz bands may be used in combination in accordance with Capability information of Multi-Link communication of the STA and AP, or a plurality of channels may be selected from the 6 GHz band and used in combination.

Note that the network configuration shown in FIG. 1 is merely an example, and the following discussion is applicable to a network including many communication apparatuses in a wider area or to various positional relationships between communication apparatuses.

Arrangement of Communication Apparatus

Figure 2:
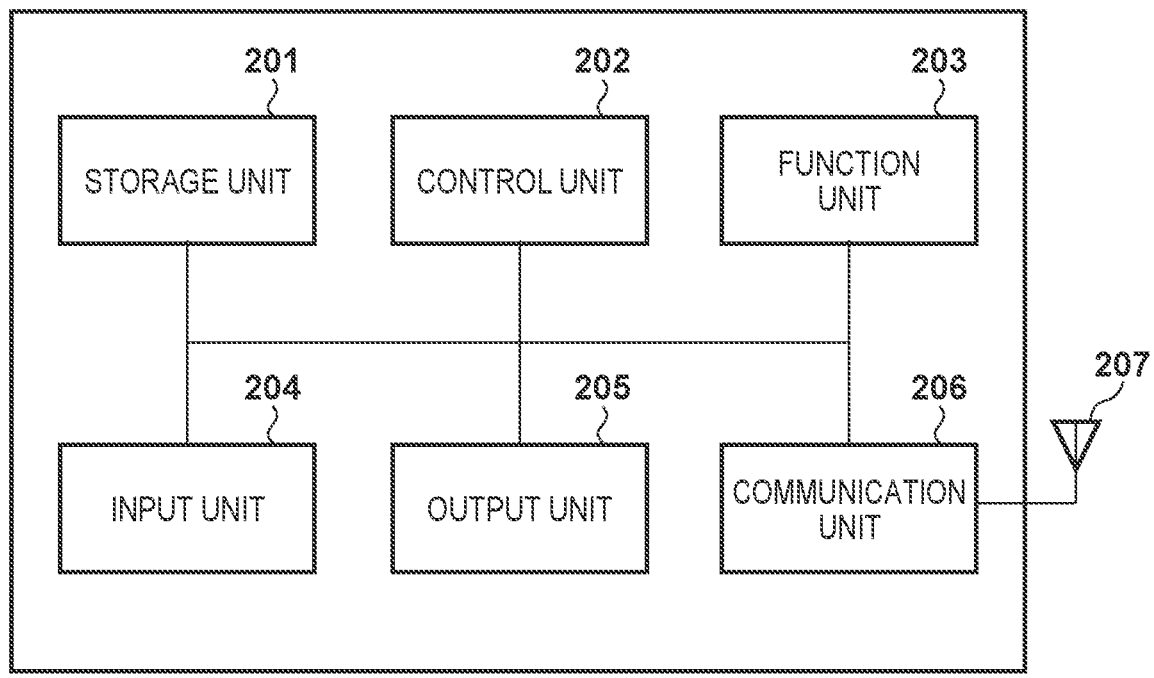
FIG. 2 shows an example of the hardware arrangement of a communication apparatus (STA or AP).

Next, the arrangement of the communication apparatus (AP or STA) according to the embodiment will be explained. FIG. 2 shows an example of the hardware arrangement of the AP according to the embodiment. As an example of the hardware arrangement, the AP includes a storage unit 201, a control unit 202, a function unit 203, an input unit 204, an output unit 205, a communication unit 206, and an antenna 207. Note that the STA also has a hardware arrangement similar to that of the AP, and the following description is applicable to the STA.

The storage unit 201 is formed by both of a Read Only Memory (ROM) and a Random Access Memory (RAM) or one of them, and stores programs for performing various kinds of operations (to be described later) and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a non-volatile memory card, or a DVD may be used as the storage unit 201.

The control unit 202 is formed by, for example, a processor such as a Central Processing Unit (CPU) or a Micro Processing Unit (MPU), an Application Specific Integrated Circuit (ASIC), a Digital Signal Processor (DSP), a Field Programmable Gate Array (FPGA), or the like. The control unit 202 controls the entire AP by executing the programs stored in the storage unit 201. Note that the control unit 202 may control the entire AP in cooperation with the programs stored in the storage unit 201 and an Operation System (OS).

The control unit 202 controls the function unit 203 to execute predetermined processing such as image capturing, printing, or projection. The function unit 203 is hardware used by the AP to execute predetermined processing. For example, in a case where the AP is a camera, the function unit 203 is an image capturing unit and performs image capturing processing. For example, in a case where the AP is a printer, the function unit 203 is a printing unit and performs printing processing. For example, in a case where the AP is a projector, the function unit 203 is a projection unit and performs projection processing. Data to be processed by the function unit 203 may be data stored in the storage unit 201, or may be data communicated with another communication apparatus via the communication unit 206 (to be described later).

The input unit 204 accepts various operations from a user. The output unit 205 performs various outputs to the user. Here, the output by the output unit 205 includes at least one of display on a screen, audio output by a loudspeaker, vibration output, and the like. Note that both the input unit 204 and the output unit 205 may be implemented by one module, like a touch panel.

The communication unit 206 controls wireless communication complying with the IEEE802.11 standard series, or controls IP communication. In the embodiment, the communication unit 206 can perform processing complying with at least the IEEE802.11ax standard. In addition, the communication unit 206 controls the antenna 207 to transmit and receive radio signals for wireless communication. The AP communicates a content such as image data, document data, or video data with another communication apparatus via the communication unit 206.

The antenna 207 is an antenna capable of receiving signals in one of the sub-GHz band, 2.4 GHz band, 5 GHz band, and 6 GHz band. The antenna 207 may be constituted physically by one or more antennas in order to implement Multi-Input and Multi-Output (MIMO) transmission/reception.

Figure 3:
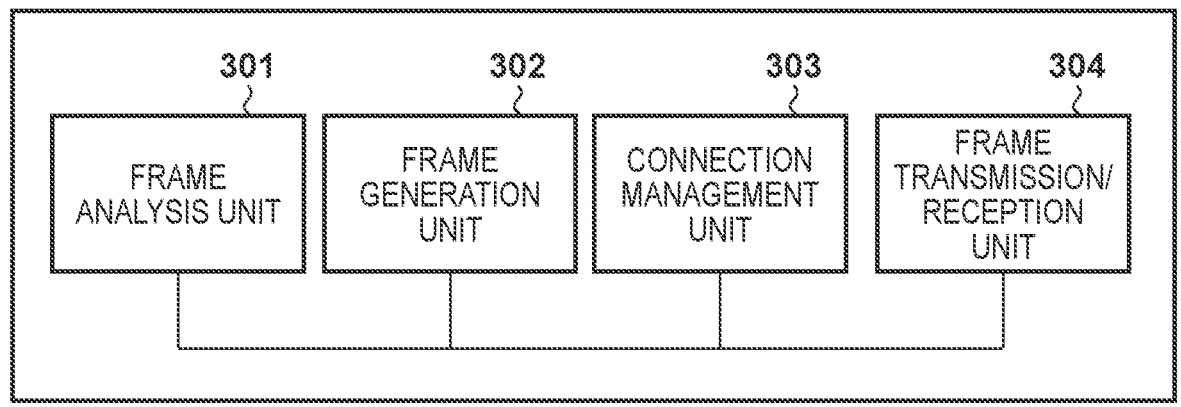
FIG. 3 shows an example of the functional arrangement of the communication apparatus (STA or AP).

FIG. 3 shows an example of the functional arrangement of the AP according to the embodiment. As an example of the functional arrangement, the AP includes a frame analysis unit 301, a frame generation unit 302, a connection management unit 303, and a frame transmission/reception unit 304. Note that the STA also has a functional arrangement similar to that of the AP, and the following description is applicable to the STA.

The frame analysis unit 301 analyzes a frame received from a communication partner apparatus (opposing communication apparatus). The frame generation unit 302 generates a frame to be transmitted to the communication partner apparatus. The connection management unit 303 manages a connection between the AP and the communication partner apparatus. For example, the connection management unit 303 performs arrangement/agreement (BlockAck Agreement) of BlockAck (BA) during connection and management of the sequence number (Sequence Number) of data with respect to each communication partner apparatus. BlockAck Agreement and Sequence Number are managed for each Traffic Identifier (TID): identifier representing the type of traffic (data) in connection. The frame transmission/reception unit 304 transmits/receives frames between the AP and the communication partner apparatus via the communication unit 206 and the antenna 207 (FIG. 2).

Communication Sequence between AP and STA

Figure 4:
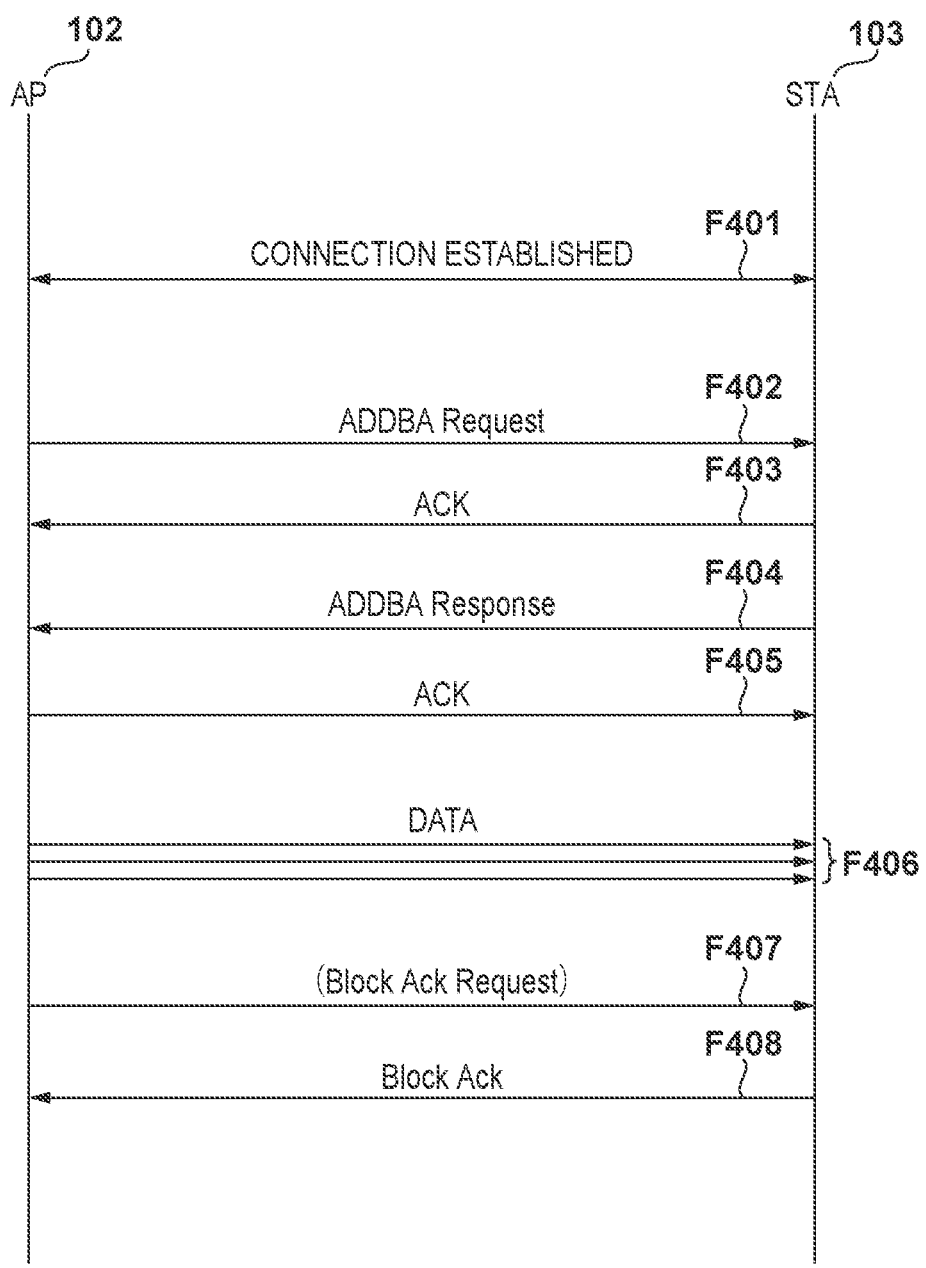
FIG. 4 is a sequence chart showing a communication sequence for data communication between the AP and the STA.

FIG. 4 is a sequence chart showing a communication sequence for data communication between the AP 102 and the STA 103. The processing of the sequence can start in response to turning on the AP 102 and the STA 103, respectively. Alternatively, the processing of the sequence may start when at least either of the AP 102 and STA 103 is instructed by a user or an application to start wireless communication.

First, in F401, the AP 102 and the STA 103 establish a wireless connection by performing connection processing according to the IEEE802.11 standard. The embodiment is applicable to both a case where no encryption of communication is performed and a case where encryption is performed. In the case where encryption is performed, the embodiment is applicable regardless of a cipher system (security system) such as WEP (Wired Equivalent Privacy), WPA (Wi-Fi Protected Access) 1, WPA2, WPA3, WPS (Wi-Fi Protected Setup), or another system.

In this example, the AP 102 transmits data to the STA 103. After the connection is established in F401, the AP 102 transmits an ADDBA Request frame to the STA 103 in F402, and receives an ACK frame as an acknowledgement in F403. The STA 103 transmits an ADDBA Response frame to the AP 102 in F404, and receives an ACK frame as an acknowledgement in F405. Upon completion of exchanging the ADDBA Request and the ADDBA Response (processes in F402 to F405), BlockAck Agreement is built between the AP 102 and the STA 103 in regard to data transmission from the AP 102 to the STA 103.

The BlockAck Agreement will be explained. The ADDBA Request frame and the ADDBA Response frame include a BlockAckPolicy parameter. When a communication apparatus that has received the frame agrees with the parameter, it transmits an ACK frame. The BlockAckPolicy parameter is set to be Immediate (Immediate BlockAck) or Delay (Delayed BlockAck). The example in FIG. 4 shows the Immediate setting. The AP 102 transmits a BlockAck Request frame, and upon receiving the frame, the STA 103 sends back a BlockAck frame. In contrast, when BlockAckPolicy is set to be Delayed (not shown), the STA 103 sends back an ACK frame (instead of sending back the BlockAck frame in F408). The STA 103 transmits a BlockAck frame in a TXOP (Transmission Opportunity) period obtained later.

The ADDBA Request frame includes various parameters (for example, Starting Sequence Number (start sequence number)) of information (Starting Sequence Control) about the start number of data to be transmitted in one BA session. The initial value of Starting Sequence Number can be decided by exchanging ADDBA Request/Response. Subsequent update of Starting Sequence Number can comply with a method defined by the IEEE802.11 standard.

The ADDBA Request/Response frame can include BA Type (BA Type field representing the type of BlockAck) supported by the self-apparatus. A communication apparatus that has received the frame records and manages BA Type supported by the communication partner apparatus.

In the embodiment, when building BlockAck Agreement, the connection management unit 303 of each of the AP 102 and STA 103 records and manages, in the storage unit 201, various parameters and information described above for the TID.

After building BlockAck Agreement, the AP 102 can transmit a plurality of data frames before receiving an ACK frame from the STA 103 serving as a communication partner apparatus (opposing communication apparatus). For example, the AP 102 transmits a plurality of MPDUs (data frames) in F406 (data transmission processing), and the STA 103 transmits a Block Ack frame in F408 as an acknowledgement of the plurality of MPDUs. As described above, in the example of FIG. 4, Immediate is set in the BlockAckPolicy parameter. After the AP 102 transmits a BlockAck Request frame (F407), the STA 103 sends back a BlockAck frame (F408).

In the example of FIG. 4, the AP 102 transmits a BlockAckRequest frame to the STA 103 in F407. Instead, the AP 102 may set, in Implicit BlockAck Request, an Ack Policy subfield included in a QoS Control field in at least one MPDU among MPDUs in F406. The AP 102 can request a BlockAck frame of the STA 103 without transmitting a BlockAckRequest frame (F407).

Configuration of BlockAck Frame

Next, the configuration of a BlockAck frame for reducing the data amount of a BlockAck frame (corresponding to F408 in FIG. 4) transmitted by the STA 103 will be explained. Note that FIG. 4 shows an example of data transmission from the AP 102 to the STA 103, but the following description is similarly applicable to data transmission from the STA 103 to the AP 102.

In FIGS. 5, 5a to 5c represent the configuration of a BlockAck frame in 802.11ax. As a description common to 5a to 5c, Octests and Bits represent the sizes of respective fields. A field referred to as "variable" means a variable length. A description of a field having no reference numeral will be omitted.

5a represents the configuration of the entire BlockAck frame. The BlockAck frame is formed by a MAC header field 501, a BA Control field 502, a BA Information field 503, and a FCS field.

5b represents the configuration of the BA Control field 502. The BA Control field 502 is formed by a BA Ack Policy subfield, a BA Type subfield 504, a Reserved subfield 505, and a TID INFO subfield. The format of the BA Information field 503 is defined in accordance with information set in the BA Type subfield 504. In the IEEE802.11ax standard, BA Type 0, 4, 5, 7 to 9, and 12 to 15 are designated in a Reserved area. In the embodiment, at least one BA Type in the Reserved region is used to define new BA Type.

5c represents the configuration of the BA Information field 503 defined in new BA Type. The BA Information field 503 is formed by a BA Subtype subfield 507 and an ACK Info subfield 506. As described in Bits, 0 may be set in the BA Subtype subfield 507. In this case, information equivalent to BA Subtype may be expressed using a Reserved area in the BA Type subfield 504 or a Reserved area in the Reserved subfield 505. Note that the names "BA Subtype" and "ACK Info" presented here are merely examples, and the present invention is not limited to them.

Configuration of ACK Info Subfield

Some configuration examples of the ACK Info subfield 506 in 5c according to the embodiment will be explained with reference to 6a to 6c in FIGS. 6 and 7a to 7c in FIG. 7. Note that the name, size, and storage order of each portion described below are merely examples, and the present invention is not limited to them as long as a similar function is obtained.

Figure 6:
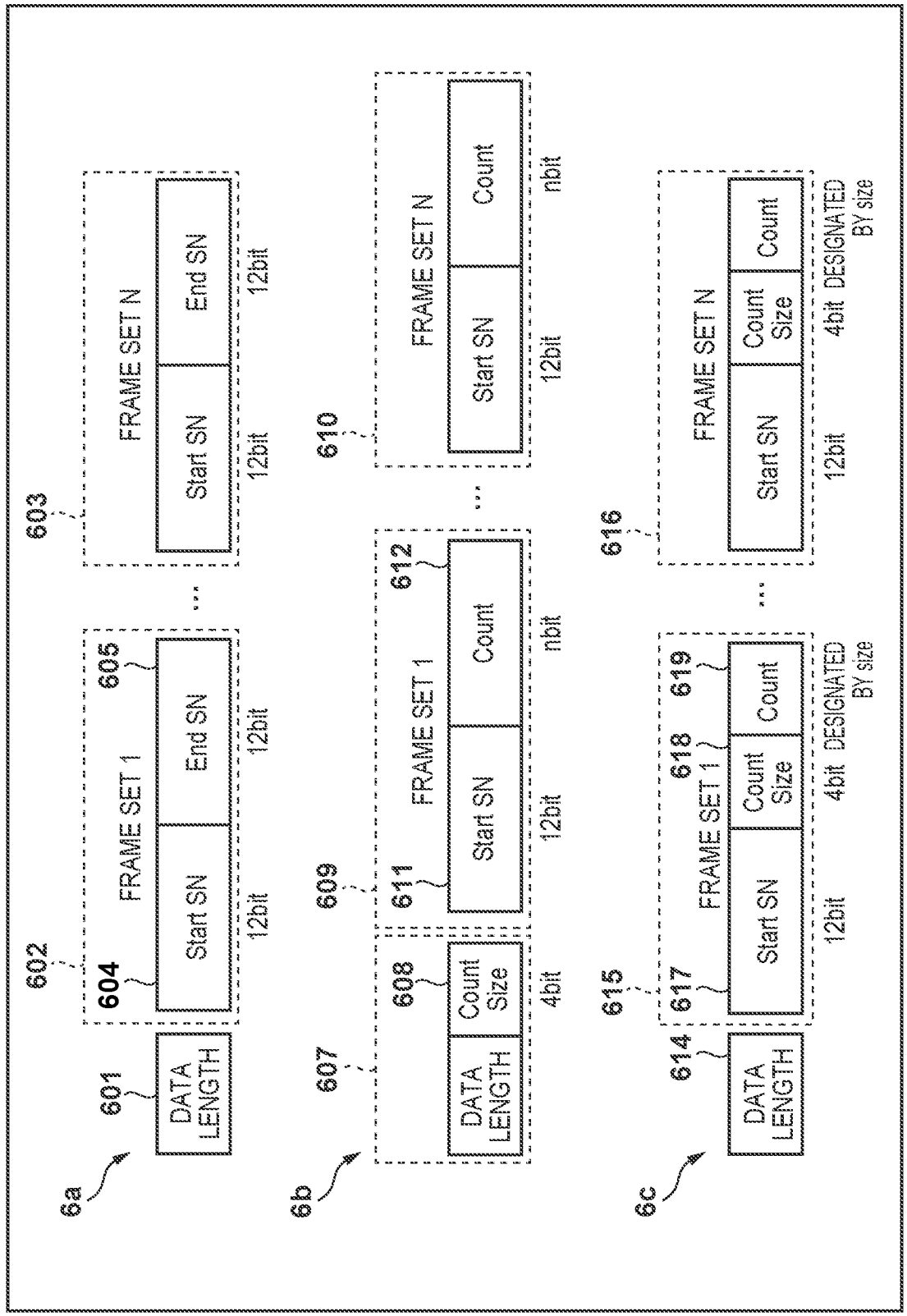
FIG. 6 shows configuration examples 1 to 3 of an ACK Info subfield.

Configuration (Configuration Examples 1 to 3) of ACK Info Subfield Representing Received MPDU FIG. 6 shows configuration examples 1 to 3 of the ACK Info subfield 506. Configuration examples 1 to 3 are configuration examples when the STA 103 transmits information about a received MPDU. As a configuration common to configuration examples 1 to 3, the ACK Info subfield 506 is formed by an ACK Info header portion (corresponding to an ACK Info header portion 601, 607, or 614) including meta information of the entire ACK Info, and an ACK Info data portion including specification information (corresponding to a frame set 602, 603, 609, 610, 615, or 616) that specifies a received frame set (data frame set). Note that the names "ACK Info header" and "ACK Info data" mentioned here are merely examples, and the present invention is not limited to them.

The STA 103 distinguishes, as a frame set, data received from the AP 102 for every cluster of a series of data (every series of data frames) having consecutive sequence numbers. That is, when an omission occurs in the sequence number of received data, the frame set is divided at this point. The STA 103 transmits an acknowledgement (Block- Ack) in which information about all received frame sets is included in the ACK Info subfield 506. According to a conventional BlockAck Bitmap method, one bit is assigned to one MPDU. Instead, data are handled as a cluster, that is, a frame set, and the total data amount can be reduced to reduce a band consumed by transmission of a BlockAck frame. Note that the ACK Info data portion includes 0 or more pieces of frame set information, and the number of pieces of frame set information varies in accordance with the number of received frame sets. A data length included in the ACK Info header portion may or may not include the data length of the ACK Info header portion.

Configuration Example 1

In FIG. 6, 6a represents configuration example 1 of the ACK Info subfield 506. The ACK Info header portion 601 in configuration example 1 includes information representing a data length (data length of information designating all subsequent frame sets) included in the ACK Info data portion. This information can be information representing the end of a data frame set. As a method of representing a data length, the data length of a subsequent ACK Info portion can be stored by bits, bytes, or the number of frame sets (24 bits per frame set in this example). Note that the present invention is not limited to this method as long as a data length can be represented.

In IEEE802.11, Sequence Number (sequence number) is expressed by 12 bits and a value of 0 to 4095. In configuration example 1, a start sequence number (Start SN) 604 and an end sequence number (End SN) 605 in each frame set are used as a method of expressing the frame sets 602 and 603. Each of the start sequence number 604 and the end sequence number 605 can be expressed by 12 bits, respectively. The start sequence number 604 represents the sequence number of a MPDU corresponding to the start of each received frame set. The end sequence number 605 represents the sequence number of a MPDU corresponding to the end of each received frame set.

Configuration Example 2

In FIG. 6, 6b represents configuration example 2 of the ACK Info subfield 506. Similar to configuration example 1, the ACK Info header portion 607 in configuration example 2 includes information representing a data length included in the ACK Info data portion. As a method of representing a data length, the data length of a subsequent ACK Info portion can be stored by bits, bytes, or the number of frame sets (12 bits per frame set+the number of bits represented by a Count Size portion 608 in this example). Note that the present invention is not limited to this method as long as a data length can be represented. In configuration example 2, the ACK Info header portion 607 further includes the Count Size portion 608. The Count Size portion 608 represents the size of a Count portion (corresponding to a Count portion 612) in the frame set 609 or 610.

In configuration example 2, a start sequence number (Start SN) 611 and the Count portion 612 in each frame set are used as a method of expressing the frame sets 609 and 610. Similar to configuration example 1, the start sequence number 611 represents the sequence number of a MPDU corresponding to the start of each received frame set. The Count portion 612 holds information representing the number of received MPDUs having consecutive sequence numbers starting from the start sequence number 611. If the size of the Count portion designated by the Count Size portion 608 is small, the maximum number of MPDUs expressible as a frame set becomes small, but a data length necessary to express one frame set can be decreased. To the contrary, if the size of the Count portion designated by the Count Size portion 608 is large, the maximum number of MPDUs expressible as a frame set can be increased, but a data length necessary to express one frame set becomes large. A Count Size used is not limited to this example. The start sequence number can be expressed by 12 bits.

In this configuration example, the upper limit of the number of MPDUs expressible in one frame set is defined by the Count Size portion 608. Thus, even MPDUs having consecutive sequence numbers are sometimes expressed as separate frame sets.

Configuration Example 3

In FIG. 6, 6c represents configuration example 3 of the ACK Info subfield 506. Similar to configuration example 1, the ACK Info header portion 614 in configuration example 3 includes information representing a data length included in the ACK Info data portion. As a method of representing a data length, the data length of a subsequent ACK Info portion can be stored by bits, bytes, or the number of frame sets (16 bits per frame set+the number of bits represented by the Count Size portion of each frame in this example). Note that the present invention is not limited to this method as long as a data length can be represented. In configuration example 3, a start sequence number (Start SN) 617, a Count Size portion 618, and a Count portion 619 in each frame set are used as a method of expressing the frame sets 615 and 616. The Count Size portion 608 stored in the ACK Info header portion 607 in configuration example 2 is stored as the Count Size portion 618 in each frame set. A proper Count Size can be set in each frame set without fixing the Count Size at the header portion. A proper Count Size can be set by setting a large Count Size when the number of frames to be expressed in a frame set is large, or a small Count Size when the number of frames to be expressed is small.

Figure 7:
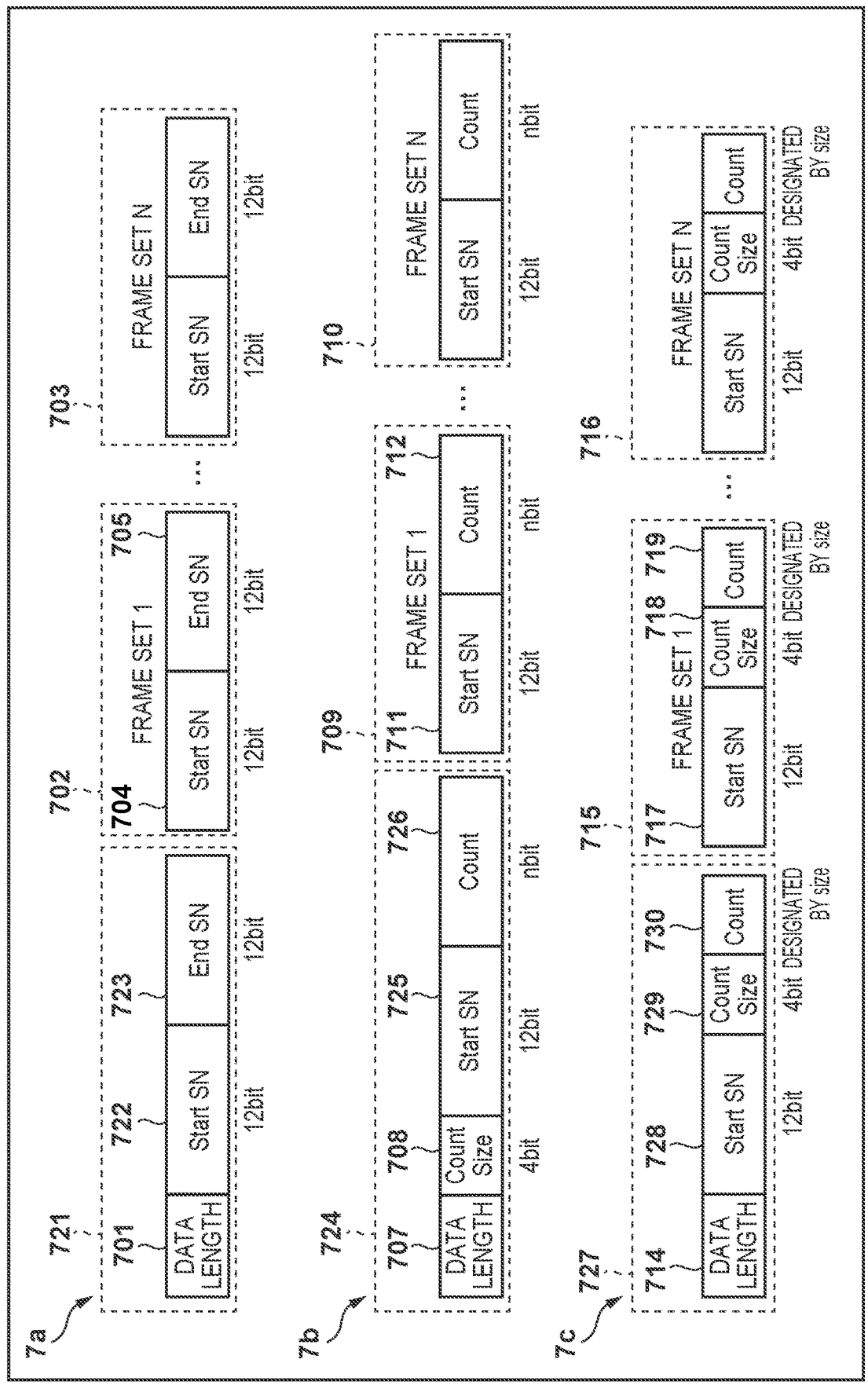
FIG. 7 shows configuration examples 4 to 6 of the ACK Info subfield.

Configuration (Configuration Examples 4 to 6) of ACK Info Subfield Representing Unreceived MPDU FIG. 7 shows configuration examples 4 to 6 of the ACK Info subfield 506. Configuration examples 4 to 6 are configuration examples when the STA 103 transmits information about a MPDU that has not been received. As a configuration common to configuration examples 4 to 6, the ACK Info subfield 506 is formed by an ACK Info header portion (corresponding to an ACK Info header portion 721, 724, or 727) including meta information of the entire ACK Info, and an ACK Info data portion including specification information (corresponding to a frame set 702, 703, 709, 710, 715, or 716) that specifies an unreceived frame set (data frame set). Note that the names "ACK Info header" and "ACK Info data" mentioned here are merely examples, and the present invention is not limited to them.

The STA 103 distinguishes, as a frame set, data not received from the AP 102 for every cluster of a series of data having consecutive sequence numbers. That is, when an omission occurs in the sequence number of unreceived data, the frame set is divided at this point. The STA 103 transmits an acknowledgement (BlockAck) in which information about all unreceived frame sets is included in the ACK Info subfield 506. According to a conventional BlockAck Bitmap method, one bit is assigned to one MPDU. Instead, data are handled as a cluster, that is, a frame set, and the total data amount can be reduced to reduce a band consumed by transmission of a BlockAck frame. Note that the ACK Info data portion includes 0 or more pieces of frame set information, and the number of pieces of frame set information varies in accordance with the number of unreceived frame sets.

Configuration examples 4 to 6 differ from configuration examples 1 to 3 in that the ACK Info header portion includes information for identifying the first and final frames out of newly received data frames (information representing the start and end sequence numbers of one or more frame sets in this example). In configuration examples 4 to 6, the ACK Info data portion includes information about an unreceived MPDU, so only this information cannot specify the range of sequence numbers of MPDUs that have been received. The sequence numbers of received MPDUs can be specified by combining information representing the start and end sequence numbers of frame sets expressed by the entire ACK Info subfield 506, and the sequence number of an unreceived MPDU. A data length included in the ACK Info header portion may or may not include the data length of the ACK Info header portion.

Configuration Example 4

In FIG. 7, 7a represents configuration example 4 of the ACK Info subfield 506. The ACK Info header portion 721 in configuration example 4 includes information 701 representing a data length (data length of information designating all subsequent frame sets) included in the ACK Info data portion. This information can be information representing the end of a data frame set. As a method of representing a data length, the data length of a subsequent ACK Info portion can be stored by bits, bytes, or the number of frame sets (24 bits per frame set in this example). Note that the present invention is not limited to this method as long as a data length can be represented.

In IEEE802.11, Sequence Number (sequence number) is expressed by 12 bits and a value of 0 to 4095. In configuration example 4, a start sequence number (Start SN) 704 and an end sequence number (End SN) 705 in each frame set are used as a method of expressing the frame sets 702 and 703. Each of the start sequence number 704 and the end sequence number 705 can be expressed by 12 bits, respectively. The start sequence number 704 represents the sequence number of a MPDU corresponding to the start of each unreceived frame set. The end sequence number 705 represents the sequence number of a MPDU corresponding to the end of an unreceived frame set. In configuration example 4, the ACK Info header portion 721 includes a start sequence number 722 and end sequence number 723 of a received frame set.

Configuration Example 5

In FIG. 7, 7b represents configuration example 5 of the ACK Info subfield 506. Similar to configuration example 4, the ACK Info header portion 724 in configuration example 5 includes information representing a data length included in the ACK Info data portion. As a method of representing a data length, the data length of a subsequent ACK Info portion can be stored by bits, bytes, or the number of frame sets (12 bits per frame set+the number of bits represented by a Count Size portion 708 in this example). Note that the present invention is not limited to this method as long as a data length can be represented. In configuration example 5, the ACK Info header portion 724 further includes the Count Size portion 708. The Count Size portion 708 represents the size of a Count portion (corresponding to a Count portion 712) in the frame set 709 or 710, and further the size of a Count portion 726 included in the ACK Info header portion 724.

In configuration example 5, a start sequence number (Start SN) 711 and the Count portion 712 in each frame set are used as a method of expressing the frame sets 709 and 710. Similar to configuration example 4, the start sequence number 711 represents the sequence number of a MPDU corresponding to the start of an unreceived frame set. The Count portion 712 holds information representing the number of unreceived MPDUs having consecutive sequence numbers starting from the start sequence number 711. If the size of the Count portion designated by the Count Size portion 708 is small, the maximum number of MPDUs expressible as a frame set becomes small, but a data length necessary to express one frame set can be decreased. To the contrary, if the size of the Count portion designated by the Count Size portion 708 is large, the maximum number of MPDUs expressible as a frame set can be increased, but a data length necessary to express one frame set becomes large. A Count Size used is not limited in this example. The start sequence number can be expressed by 12 bits.

In this configuration example, the upper limit of the number of MPDUs expressible in one frame set is defined by the Count Size portion 708. Thus, even MPDUs having consecutive sequence numbers are sometimes expressed as separate frame sets.

In this configuration example, the ACK Info header portion 724 includes a start sequence number 725 of a received frame set, and the Count portion 726 meaning the total number (number) of MPDUs from the start sequence number 725 to an end sequence number. The size of the Count portion 726 in the ACK Info header portion 724 is not defined by the Count Size portion 708 and is fixed at 12 bits, or a Count Size portion representing information of the Count portion 726 may be separately held in the ACK Info header portion.

Configuration Example 6

In FIG. 7, 7c represents configuration example 6 of the ACK Info subfield 506. Similar to configuration example 4, the ACK Info header portion 727 in configuration example 6 includes information representing a data length included in the ACK Info data portion. As a method of representing a data length, the data length of a subsequent ACK Info portion can be stored by bits, bytes, or the number of frame sets (16 bits per frame set+the number of bits represented by the Count Size portion of each frame in this example). Note that the present invention is not limited to this method as long as a data length can be represented. In configuration example 6, a start sequence number (Start SN) 717, a Count Size portion 718, and a Count portion 719 in each frame set are used as a method of expressing the frame sets 715 and 716. The Count Size portion 708 stored in the ACK Info header portion 724 in configuration example 5 is stored in each frame set. A proper Count Size can be set in each frame set without fixing the Count Size at the header portion. A proper Count Size can be set by setting a large Count Size when the number of frames to be expressed in a frame set is large, or a small Count Size when the number of frames to be expressed is small.

In this configuration example, the ACK Info header portion 727 includes a start sequence number 728 of a received frame set, a Count portion 730 meaning the total number of MPDUs from the start sequence number 728 to an end sequence number, and a Count Size portion 729 representing size information of the Count portion 730.

As for configuration example 4, when the number of received frames is one, the same sequence number may be set in the start sequence number 722 and the end sequence number 723 in the ACK Info header portion 721. As for configuration example 4, when no frame has been normally received, only one frame set (that is, only the frame set 702) may be included in the ACK Info subfield 506. At this time, an already received value (for example, a value represented by Starting Sequence Control) based on information about the start number of data transmitted by the transmitting side may be set in the start sequence number 704. This also applies to configuration examples 5 and 6.

Notification Method of Configuration of ACK Info Subfield

The transmitting side of a BlockAck frame can specify (designate), in the frame, one of configuration examples 1 to 6 with which the ACK Info subfield 506 is constituted, and notify the receiving side of it. For example, one of configuration examples 1 to 6 to be used can be specified using at least one of the BA Type subfield 504, the Reserved subfield 505, and the BA Subtype subfield 507.

For example, BA Type0 meaning Reserved in the BA Type subfield 504 may be defined as BA Type meaning which one of configuration examples 1 to 6 is used. Further, one of configuration examples 1 to 6 to be used may be specified using at least three bits in another Reserved area of the BA Type subfield 504, the Reserved subfield 505, or the BA Subtype subfield 507. More specifically, in a case where the BA Subtype subfield 507 is used, it may be defined that when bits "0000" are designated in the BA Subtype subfield 507, configuration example 1 is used, and when bits "0001" is designated, configuration example 2 is used.

Alternatively, one of configuration examples 1 to 6 to be used may be specified by combining the existing BA Type subfield 504 and a predetermined (sub)field. For example, a case where the BA Type subfield 504 is set to be Multi-TID or Multi-STA will be assumed. When the BA Type subfield 504 is set to be Multi-TID, one of configuration examples 1 to 6 to be used may be specified using the area of the Reserved subfield 505.

The standard may be defined to essentially represent whether a communication partner apparatus supports a new BA Type according to the embodiment (that is, the configuration of the ACK Info subfield 506 in configuration examples 1 to 6) (whether it has capability information corresponding to the new BA Type). Alternatively, in the example of FIG. 4, the AP 102 and the STA 103 may exchange capability information through exchange of ADDBA Request/Response frames (at the time of building BlockAck Agreement). Alternatively, the capability may be negotiated through exchange of other management frames.

Processing on Data Frame Receiving Side

Figure 8:
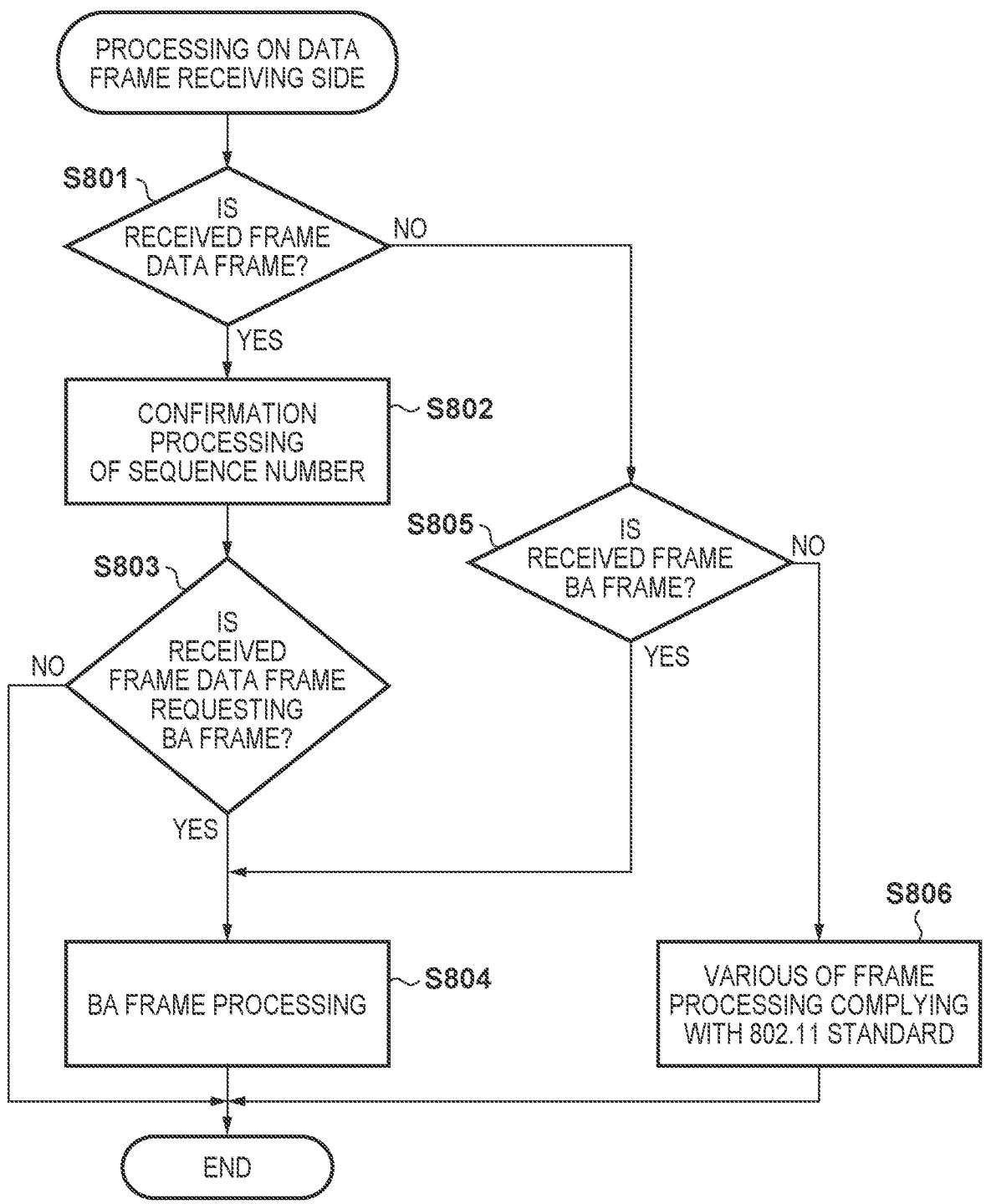
FIG. 8 is a flowchart of processing to be executed by an apparatus on the data frame receiving side.

Next, processing on a data frame receiving side according to the embodiment will be described with reference to FIG. 8. FIG. 8 is a flowchart of processing to be executed by an apparatus on the data frame receiving side. A case where the apparatus on the data frame receiving side is the STA 103 as in FIG. 4 will be exemplified. However, this description is similarly applicable to a case where the AP 102 is the operation entity. The processing can start after the STA 103 establishes a wireless connection to a communication partner apparatus (AP 102 in the example of FIG. 4) and ends exchange of ADDBA Request/Response frames.

As described above, when building BlockAck Agreement (F402 to F405 in FIG. 4), the connection management unit 303 of each of the STA 103 and AP 102 records and manages, in the storage unit 201, various parameters such as Starting Sequence Number in the BA session. Further, the connection management unit 303 of each of the STA 103 and AP 102 records and manages, in the storage unit 201, information of BA Type (that can also include a new BA Type according to the embodiment) supported by the communication partner apparatus.

When the frame transmission/reception unit 304 of the STA 103 receives a wireless frame from the communication partner apparatus, the frame analysis unit 301 starts analysis processing of the received frame. Note that when the frame is not addressed to the STA 103 or the frame is broken (for example, the FCS value is illicit), the STA 103 may discard the frame without starting the processing.

As the frame analysis processing, the frame analysis unit 301 first determines whether the received frame is a data frame (S801). This can be determined by, for example, confirming whether a Type field in Frame Control Field included in a MAC header in a MAC frame format defined by the IEEE802.11 standard is "10". It can be determined that the frame is a data frame if the Type field is "10"; otherwise, is not a data frame.

If it is determined that the received frame is a data frame (YES in S801), the connection management unit 303 executes confirmation processing of the sequence number of the data frame (S802). Details of the processing in S802 will be described with reference to FIG. 9. After the processing in S802, the frame analysis unit 301 determines whether the received frame is a data frame requesting a BlockAck frame (S803). This can be determined by, for example, confirming whether an Ack Policy subfield included in a QoS Control field in at least one or more MPDUs out of MPDUs included in the data frame is set to be Implicit BlockAck Request ("00"). If the Ack Policy subfield is set to be "00", the frame analysis unit 301 determines that the received frame is a data frame requesting the BlockAck frame (YES in S803), and the process advances to S804. If the Ack Policy subfield is not set to be "00", the frame analysis unit 301 determines that the received frame is not a data frame requesting the BlockAck frame, and the frame reception processing ends. In S804, the STA 103 performs BlockAck (BA) frame generation/transmission processing. Details of the processing in S804 will be described with reference to FIG. 10.

If it is determined in S801 that the received frame is not a data frame (NO in S801), the frame analysis unit 301 determines whether the received frame is a BAR (BlockAck Request) frame (S805). For example, when the above-described Type frame is "01" and a Subtype field in Frame Control Field in the MAC header is "1000", the received frame can be specified as a BAR frame. If the frame analysis unit 301 determines that the received frame is a BAR frame (YES in S805), the process advances to S804, and the STA 103 executes BA frame generation/transmission processing. The BAR frame can include information about the start number of data. If it is determined in S805 that the received frame is not a BAR frame (NO in S805), the STA 103 executes processing corresponding to various frames complying with the IEEE802.11 standard (S806), and the process ends. The processing in S806 is hardly related to the embodiment, and a description thereof will be omitted.

Figure 9:
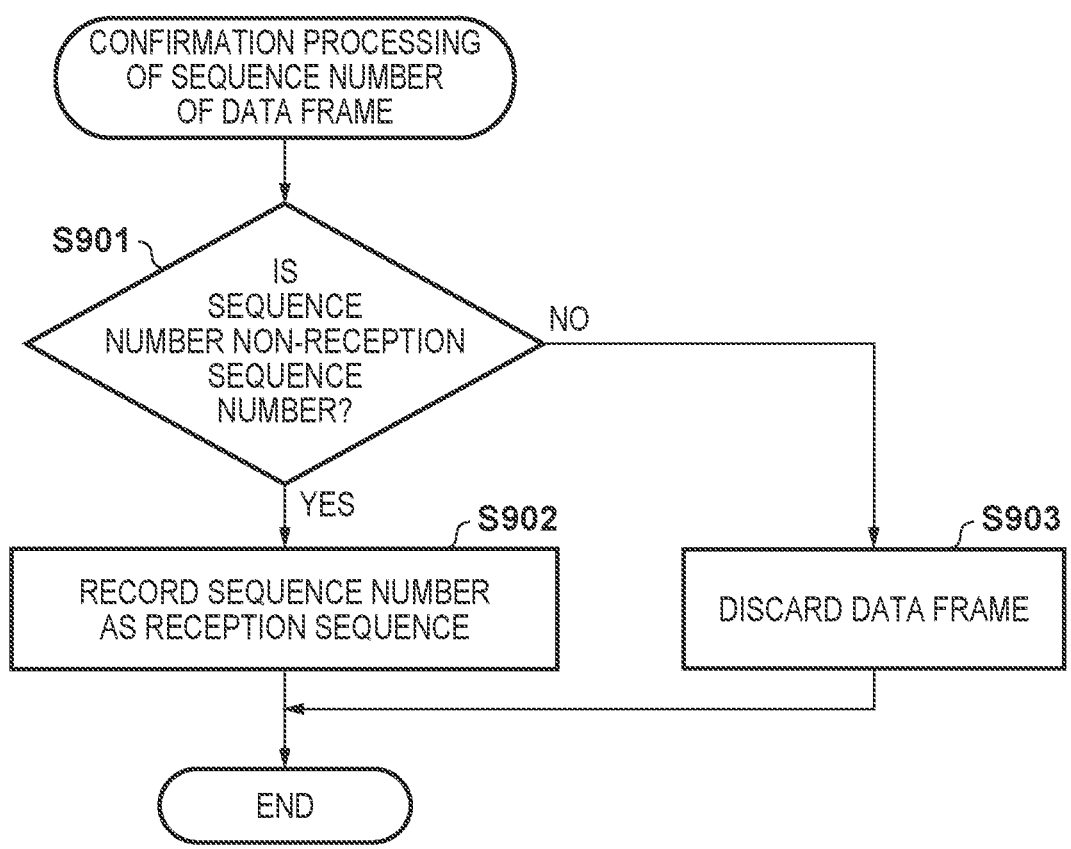
FIG. 9 is a flowchart of confirmation processing of the sequence number of a data frame.

Next, confirmation processing of the sequence number of a data frame in S802 will be described with reference to FIG. 9. FIG. 9 is a flowchart of confirmation processing of the sequence number of a data frame. Note that the sequence number of a data frame (MPDU) is represented by Sequence Number in a Sequence Control field included in a MAC header in a MAC frame format defined by the IEEE802.11 standard, and has a value ranging from 0 to 4095. When a wireless connection is established (F401 in the example of FIG. 4), the connection management unit 303 starts management of a reception sequence number (sequence number of a received data frame) regarding the connection. At the start of management, all sequence numbers of 0 to 4095 are recorded in the storage unit 201 as non-reception sequence numbers (sequence numbers of data frames not recorded as "received").

The connection management unit 303 of the STA 103 confirms whether the sequence number of the data frame (MPDU) is a non-reception sequence number (S901). That is, the connection management unit 303 collates information of the sequence number of the received data frame with reception sequence numbers recorded in the storage unit 201, and determines whether the sequence number of the received data frame is a non-reception sequence number.

If the sequence number of the received data frame is a non-reception sequence number (YES in S901), the connection management unit 303 newly records the sequence number as a reception sequence number in the storage unit 201, and the processing ends. If the sequence number of the received data frame is a reception sequence number (NO in S901), the received data frame has already been received and is regarded as a redundant frame, the data frame is discarded (S903), and the processing ends.

Next, BlockAck (BA) frame generation/transmission processing in S804 will be explained with reference to FIG. 10. FIG. 10 is a flowchart of BA frame generation/transmission processing. As described above, the connection management unit 303 of each of the STA 103 and AP 102 records and manages, in the storage unit 201, information such as BA Type (that can also include a new BA Type according to the embodiment) supported by the communication partner apparatus, and Starting Sequence Number in the BA session. As for generation of a frame, 5a to 5c in FIG. 5 will be referred to.

The connection management unit 303 of the STA 103 confirms BA Type supported by a connection (supported by the STA 103 and the AP 102) (S1001). In accordance with the support situation of the confirmed BA Type, the frame generation unit 302 can decide the content of a BlockAck frame to be generated in S1004 and S1005. Then, the connection management unit 303 of the STA 103 confirms Starting Sequence Number in the BA session. As described above, the initial value of Starting Sequence Number can be decided at the time of building BlockAck Agreement, and the value can be updated later according to a method defined by the IEEE802.11 standard. Subsequently, the connection management unit 303 confirms a reception sequence number (sequence number recorded as "received") (S1003).

The frame generation unit 302 generates a BlockAck frame using the information confirmed in S1001 to S1003. First, the frame generation unit 302 decides the configuration of the ACK Info subfield 506 in the BA Information field 503 (S1004). The frame generation unit 302 can decide the configuration of the ACK Info subfield 506 based on the supported BA Type confirmed in S1001. When the confirmed supported BA Type represents support of one of configuration examples 1 to 6, the frame generation unit 302 can decide to use one of configuration examples 1 to 6 as the configuration of the ACK Info subfield 506. Note that the use of one of configuration examples 1 to 6 may be permanently set in advance in the STA 103, or set (decided) by an input operation by a user via the input unit 204. Alternatively, the frame generation unit 302 may decide one of configuration examples 1 to 6 to be used, so as to configure the ACK Info subfield 506 with a smallest data size in accordance with the reception situation of the sequence number confirmed in S1003.

Then, the frame generation unit 302 generates the BA Control field 502 and the BA Information field 503 in accordance with the configuration of the ACK Info subfield 506 decided in S1004 so as to specify (designate) the configuration (S1005). As described above, one of configuration examples 1 to 6 to be used for the ACK Info subfield 506 can be designated by various subfields in the BA Control field 502/BA Information field 503.

Figure 5:
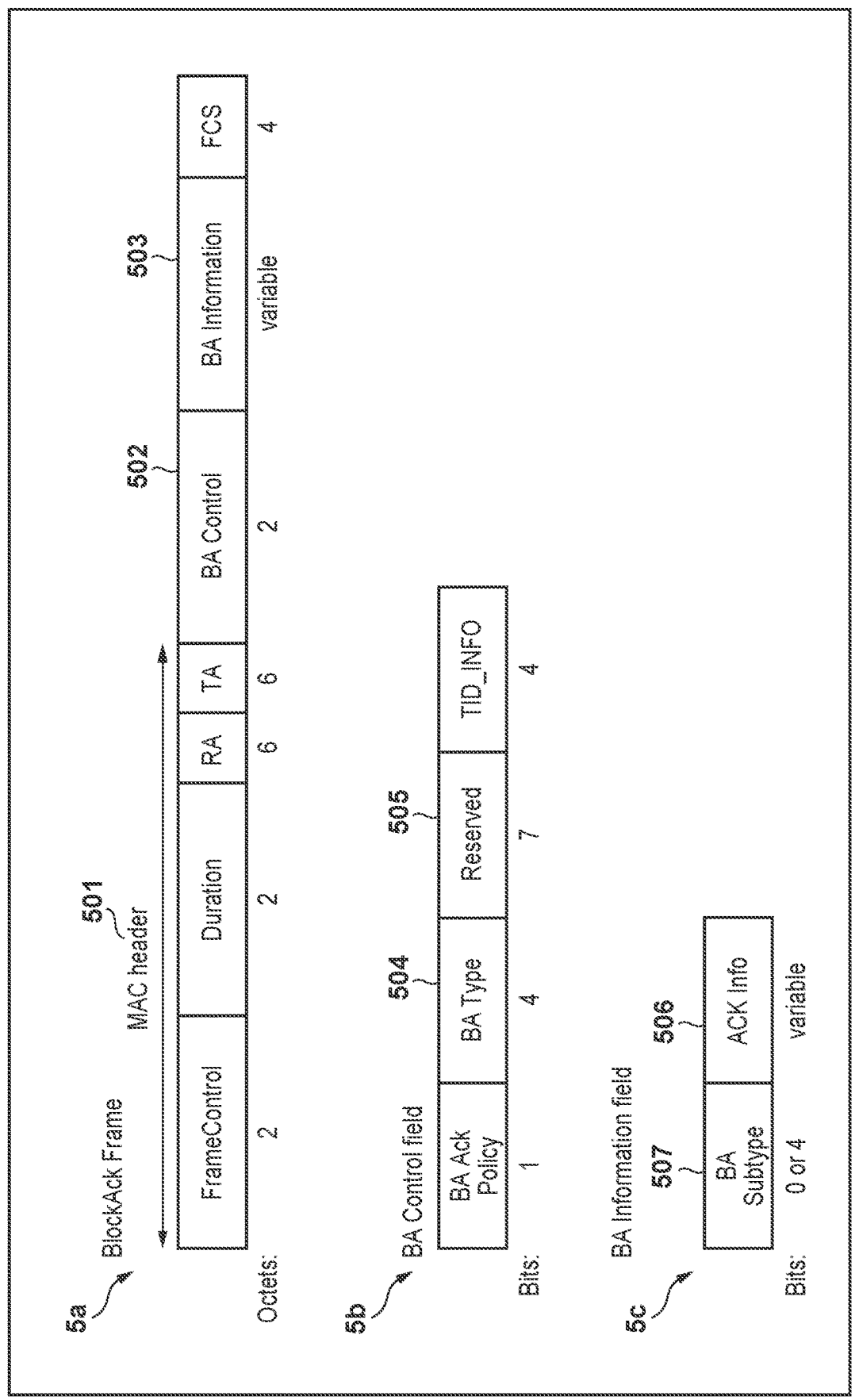
FIG. 5 shows the configuration of a BlockAck frame.

Subsequently, the frame generation unit 302 generates the MAC header field 501 and FSC field shown in 5a of FIG. 5 to complete the frame as a MAC frame, and also generates a PHY portion to complete the BlockAck frame (S1006). Finally, the frame transmission/reception unit 304 transmits, to the communication partner apparatus (AP 102), the BlockAck frame generated by the frame generation unit 302.

An acknowledgement of the transmitted frame, and retransmission processing when no acknowledgement is received in a predetermined time are executed according to the IEEE802.11 standard. When the STA 103 normally transmits the BlockAck frame and receives an acknowledgement from the AP 102, it resets the record of the reception. For example, the connection management unit 303 of the STA 103 resets the record of the reception as for a sequence number, the notification of which has been completed by the BlockAck frame, out of managed reception sequence numbers. When sequence numbers make a circuit, they can be managed.

Note that the sequences of the processes shown in FIGS. 8 to 10 are merely examples of implementing the embodiment, and the order of the processes is not limited as long as the same functions are obtained. Processes not described in the processing sequences comply with those defined in the IEEE802.11 standard.

As described above, according to the embodiment, an acknowledgement can be implemented with a smaller data amount than by a conventional method.

According to the present invention, a technique for implementing an acknowledgement with a small data amount is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus compliant with the IEEE802.11 standard series, comprising:
    a reception unit configured to receive, from a communication partner apparatus, a plurality of data frames respectively assigned with sequence numbers;
    a generation unit configured to generate an acknowledgement (Ack) frame for the plurality of data frames received by the reception unit; and
    a transmission unit configured to transmit, to the communication partner apparatus, the Ack frame generated by the generation unit,
    wherein the generation unit sets, in the Ack frame, specification information that specifies at least one data frame set distinguished for every series of data frames having consecutive sequence numbers out of the plurality of received data frames,
    wherein in a case where the generation unit sets, as the specification information in the Ack frame,
    information of a start sequence number of a series of data frames and information of an end sequence number in each data frame set, the generation unit sets information indicating a first value in at least one of a BA Type field, Reserved subfield and BA Subtype subfield in the Ack frame,
    information of a start sequence number of a series of data frames and information of the number of successive sequence numbers starting from the start sequence number to an end sequence number of the series of data frames in each data frame set, the generation unit sets information indicating a second value different from the first value in at least one of the BA Type field, the Reserved subfield, and the BA Subtype subfield in the Ack frame, and
    information of a start sequence number of a series of data frames, information of the number of successive sequence numbers starting from the start sequence number to an end sequence number of the series of data frames, and information representing a size of the information of the number in each data frame set, the generation unit sets information indicating a third value different from both the first value and the second value in at least one of the BA Type field, the Reserved subfield, and the BA Subtype subfield in the Ack frame.

2. The communication apparatus according to claim 1, wherein the generation unit sets, in the Ack frame, information representing an end of the at least one data frame set.

3. The communication apparatus according to claim 2, wherein the information representing the end of the at least one data frame set is represented by one of a bit unit, a byte unit, and the number of data frame sets.

4. A communication apparatus compliant with the IEEE802.11 standard series, comprising:
    a reception unit configured to receive, from a communication partner apparatus, a plurality of data frames respectively assigned with sequence numbers;
    a generation unit configured to generate an acknowledgement (Ack) frame for the plurality of data frames received by the reception unit; and
    a transmission unit configured to transmit, to the communication partner apparatus, the Ack frame generated by the generation unit,
    wherein the generation unit sets, in the Ack frame, information of the plurality of received data frames, and specification information that specifies at least one data frame set distinguished for every series of data frames having consecutive sequence numbers out of at least one data frame not received by the reception unit,
    wherein in a case where the generation unit sets in the Ack frame, as the information of the plurality of received data frames,
    information of a start sequence number and end sequence number of the plurality of received data frames, and as the specification information, information of a start sequence number of a series of data frames and information of an end sequence number in each data frame set, the generation unit sets information indicating a fourth value in at least one of a BA Type field, Reserved subfield and BA Subtype subfield in the Ack frame,
    information of a start sequence number of the plurality of received data frames and information of the number of successive sequence numbers starting from the start sequence number to an end sequence number of the plurality of data frames, and as the specification information, information of a start sequence number of a series of data frames and information of the number of successive sequence numbers starting from the start sequence number to an end sequence number of the series of data frames in each data frame set, the generation unit sets information indicating a fifth value different from the fourth value in at least one of the BA Type field, the Reserved subfield, and the BA Subtype subfield in the Ack frame, and
    information of a start sequence number of the plurality of received data frames and information of the number of successive sequence numbers starting from the start sequence number to an end sequence number of the plurality of data frames, and as the specification information, information of a start sequence number of a series of data frames, information of the number of successive sequence numbers starting from the start sequence number to an end sequence number of the series of data frames, and information representing a size of the information of the number in each data frame set, the generation unit sets information indicating a sixth value different from both the fourth value and the fifth value in at least one of the BA Type field, the Reserved subfield, and the BA Subtype subfield in the Ack frame.

5. The communication apparatus according to claim 4, wherein the generation unit sets, in the Ack frame, information representing an end of the at least one data frame set.

6. The communication apparatus according to claim 5, wherein the information representing the end of the at least one data frame set is represented by one of a bit unit, a byte unit, and the number of data frame sets.

7. The communication apparatus according to claim 1, wherein the Ack frame includes information representing a configuration of the Ack frame generated by the generation unit.

8. A method of controlling a communication apparatus compliant with the IEEE802.11 standard series, comprising:
receiving, from a communication partner apparatus, a plurality of data frames respectively assigned with sequence numbers;
generating an acknowledgement (Ack) frame for the received plurality of data frames; and
transmitting, to the communication partner apparatus, the generated Ack frame,
wherein in the generating, specification information that specifies at least one data frame set distinguished for every series of data frames having consecutive sequence numbers out of the plurality of received data frames is set in the Ack frame,
wherein in the generating, in a case where information of a start sequence number of a series of data frames and information of an end sequence number in each data frame set is set as the specification information in the Ack frame, information indicating a first value is set in at least one of a BA Type field, Reserved subfield and BA Subtype subfield in the Ack frame,
information of the number of successive sequence numbers starting from the start sequence number to an end sequence number of the series of data frames in each data frame set is set as the specification information in the Ack frame, information indicating a second value different from the first value is set in at least one of the BA Type field, the Reserved subfield, and the BA Subtype subfield in the Ack frame, and
information of the number of successive sequence numbers starting from the start sequence number to an end sequence number of the series of data frames, and information representing a size of the information of the number in each data frame set is set as the specification information in the Ack frame, information indicating a third value different from both the first value and the second value is set in at least one of the BA Type field, the Reserved subfield, and the BA Subtype subfield in the Ack frame.

9. A method of controlling a communication apparatus compliant with the IEEE802.11 standard series, comprising:
receiving, from a communication partner apparatus, a plurality of data frames respectively assigned with sequence numbers;
generating an acknowledgement (Ack) frame for the received plurality of data frames; and
transmitting, to the communication partner apparatus, the generated Ack frame,
wherein in the generating, information of the plurality of received data frames, and specification information that specifies at least one data frame set distinguished for every series of data frames having consecutive sequence numbers out of at least one data frame not received in the receiving is set in the Ack frame,
wherein in the generating, in a case where
information of a start sequence number and end sequence number of the plurality of received data frames is set in the Ack frame as the information of the plurality of received data frames and information of a start sequence number of a series of data frames and information of an end sequence number in each data frame set is set in the Ack frame as the specification information, information indicating a fourth value is set in at least one of a BA Type field, Reserved subfield and BA Subtype subfield in the Ack frame,
information of a start sequence number of the plurality of received data frames and information of the number of successive sequence numbers starting from the start sequence number to an end sequence number of the plurality of data frames are set in the Ack frame as the information of the plurality of received data frames, and in a case where information of a start sequence number of a series of data frames and information of the number of successive sequence numbers starting from the start sequence number to an end sequence number of the series of data frames in each data frame set is set in the Ack frame as the specification information, information indicating a fifth value different from the fourth value is set in at least one of the BA Type field, the Reserved subfield, and the BA Subtype subfield in the Ack frame, and
information of a start sequence number of the plurality of received data frames and information of the number of successive sequence numbers starting from the start sequence number to an end sequence number of the plurality of data frames are set in the Ack frame as the information of the plurality of received data frames, and in a case where information of a start sequence number of a series of data frames, information of the number of successive sequence numbers starting from the start sequence number to an end sequence number of the series of data frames, and information representing a size of the information of the number in each data frame set are set in the Ack frame as the specification information, information indicating a sixth value different from both the fourth value and the fifth value is set in at least one of the BA Type field, the Reserved subfield, and the BA Subtype subfield in the Ack frame.

10. A non-transitory computer-readable storage medium storing instructions for causing a computer to function as a communication apparatus compliant with the IEEE802.11 standard series, the communication apparatus comprising:
a reception unit configured to receive, from a communication partner apparatus, a plurality of data frames respectively assigned with sequence numbers;
a generation unit configured to generate an acknowledgement (Ack) frame for the plurality of data frames received by the reception unit; and
a transmission unit configured to transmit, to the communication partner apparatus, the Ack frame generated by the generation unit,
wherein the generation unit sets, in the Ack frame, specification information that specifies at least one data frame set distinguished for every series of data frames having consecutive sequence numbers out of the plurality of received data frames,
wherein in a case where the generation unit sets, as the specification information in the Ack frame,
information of a start sequence number of a series of data frames and information of an end sequence number in each data frame set, the generation unit sets information indicating a first value in at least one of a BA Type field, Reserved subfield and BA Subtype subfield in the Ack frame,
information of a start sequence number of a series of data frames and information of the number of successive sequence numbers starting from the start sequence number to an end sequence number of the series of data frames in each data frame set, the generation unit sets information indicating a second value different from the first value in at least one of the BA Type field, the Reserved subfield, and the BA Subtype subfield in the Ack frame, and information of a start sequence number of a series of data frames, information of the number of successive sequence numbers starting from the start sequence number to an end sequence number of the series of data frames, and information representing a size of the information of the number in each data frame set, the generation unit sets information indicating a third value different from both the first value and the second value in at least one of the BA Type field, the Reserved subfield, and the BA Subtype subfield in the Ack frame.

11. A non-transitory computer-readable storage medium storing instructions for causing a computer to function as a communication apparatus compliant with the IEEE802.11 standard series, the communication apparatus comprising:

a reception unit configured to receive, from a communication partner apparatus, a plurality of data frames respectively assigned with sequence numbers;

a generation unit configured to generate an acknowledgement (Ack) frame for the plurality of data frames received by the reception unit; and a transmission unit configured to transmit, to the communication partner apparatus, the Ack frame generated by the generation unit, wherein the generation unit sets, in the Ack frame, information of the plurality of received data frames, and specification information that specifies at least one data frame set distinguished for every series of data frames having consecutive sequence numbers out of at least one data frame not received by the reception unit, wherein in a case where the generation unit sets in the Ack frame, as the information of the plurality of received data frames, information of a start sequence number and end sequence number of the plurality of received data frames, and as the specification information, information of a start sequence number of a series of data frames and information of an end sequence number in each data frame set, the generation unit sets information indicating a fourth value in at least one of a BA Type field, Reserved subfield and BA Subtype subfield in the Ack frame, information of a start sequence number of the plurality of received data frames and information of the number of successive sequence numbers starting from the start sequence number to an end sequence number of the plurality of data frames, and as the specification information, information of a start sequence number of a series of data frames and information of the number of successive sequence numbers starting from the start sequence number to an end sequence number of the series of data frames in each data frame set, the generation unit sets information indicating a fifth value different from the fourth value in at least one of the BA Type field, the Reserved subfield, and the BA Subtype subfield in the Ack frame, and information of a start sequence number of the plurality of received data frames and information of the number of successive sequence numbers starting from the start sequence number to an end sequence number of the plurality of data frames, and as the specification information, information of a start sequence number of a series of data frames, information of the number of successive sequence numbers starting from the start sequence number to an end sequence number of the series of data frames, and information representing a size of the information of the number in each data frame set, the generation unit sets information indicating a sixth value different from both the fourth value and the fifth value in at least one of the BA Type field, the Reserved subfield, and the BA Subtype subfield in the Ack frame.

* * * * *